(12) United States Patent
So

(10) Patent No.: US 8,576,706 B2
(45) Date of Patent: *Nov. 5, 2013

(54) SYSTEMS AND METHODS FOR PROTECTING A TRUNK WITH MULTIPLE TRUNKS

(75) Inventor: Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/857,240

(22) Filed: Aug. 16, 2010

(65) Prior Publication Data

US 2010/0302938 A1  Dec. 2, 2010

Related U.S. Application Data

(63) Continuation of application No. 11/770,042, filed on Jun. 28, 2007, now Pat. No. 7,826,367.

(51) Int. Cl.
*H04L 12/26* (2006.01)

(52) U.S. Cl.
USPC ..................... 370/227; 370/395.42

(58) Field of Classification Search
USPC ......... 370/216, 217, 218, 225, 226, 227, 228, 370/229, 230, 230.1, 231, 235, 351, 352, 370/355, 356, 389, 395.1, 395.4, 395.42, 370/495.42, 395.43, 395.2, 395.21, 464, 370/465, 468
See application file for complete search history.

(56) References Cited

U.S. PATENT DOCUMENTS

| | | | |
|---|---|---|---|
| 2002/0141345 A1* | 10/2002 | Szviatovszki et al. | 370/238 |
| 2003/0039246 A1* | 2/2003 | Guo et al. | 370/389 |
| 2003/0117950 A1 | 6/2003 | Huang | |
| 2003/0126299 A1 | 7/2003 | Shah-Heydari | |
| 2004/0042402 A1 | 3/2004 | Galand et al. | |
| 2005/0259586 A1* | 11/2005 | Hafid et al. | 370/241 |
| 2006/0036892 A1* | 2/2006 | Sunna | 714/4 |
| 2006/0114818 A1 | 6/2006 | Canali et al. | |
| 2006/0140111 A1 | 6/2006 | Vasseur et al. | |

* cited by examiner

*Primary Examiner* — Obaidul Huq

(57) ABSTRACT

A system and method for protecting a trunk with multiple trunks may select a primary path on a first trunk for which to place a corresponding bypass tunnel on a second trunk. The system and method may further select one or more alternate trunks using a constraint-based trunk-selection algorithm. The system and method may further determine if at least one of the selected alternate trunks has sufficient priority bandwidth. In the event that one or more alternate trunks have priority bandwidths larger than the physical bandwidth of the primary path, the system and method may select an alternate trunk from the one or more alternate trunks having priority bandwidths larger than the physical bandwidth of the primary path based on a pre-determined order of priority bandwidth.

20 Claims, 4 Drawing Sheets

SYSTEMS AND METHODS FOR PROTECTING A TRUNK WITH MULTIPLE TRUNKS

CROSS REFERENCE

This application claims priority to pending application Ser. No. 11/770,042, filed Jun. 28, 2007, the contents of which are hereby incorporated by reference.

BACKGROUND INFORMATION

A network may deliver packets via a connectionless protocol, e.g., Internet Protocol (IP), and/or a connection oriented protocol, e.g., Multiprotocol Label Switching protocol (MPLS). Connection oriented protocols may pre-calculate a path between a source node and a destination node, and deliver packets on the path. The path may be referred to as a "primary path." The establishment of primary paths may take into consideration factors such as, but not limited to, priorities of paths, and network available bandwidth. In the event a link or node on a primary path fails, data traffic carried on the primary path must be re-routed to an alternate path within a specified time using a link/node protection, e.g., a fast reroute (FRR). As a network adds more capacity and carries more data traffic, the network may carry uneven data traffic loads among different trunks and nodes. Existing link/node protection may not optimize the alternate path building to balance the data traffic loads.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

Figure 1:
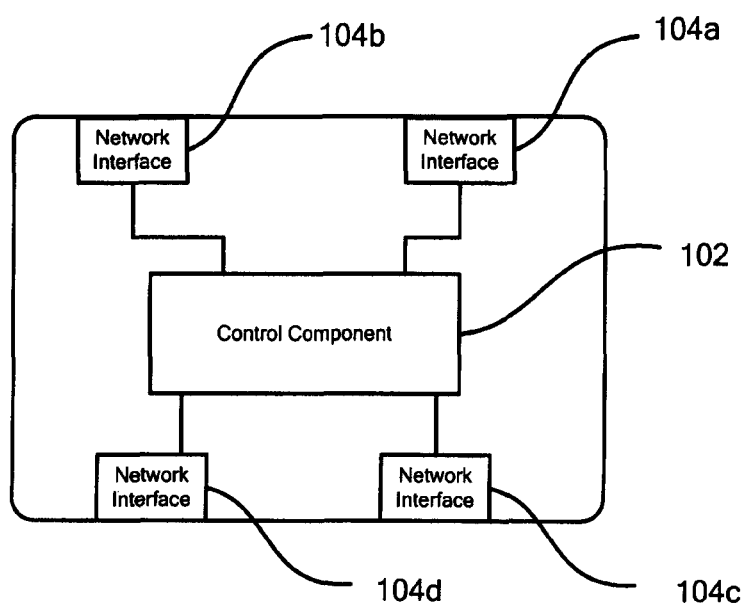
FIG. 1 is a block diagram of a network node with four network interfaces according to an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

For connection oriented networks, pre-determined alternate paths are used to protect against connection failures. Failure protection may require a fast re-route of a failed primary path to an alternate path carried on a different physical link. The fast re-route may require a limited response time, e.g., fifty milliseconds (50 ms). The physical links carrying the primary path and the alternate path may be referred to as "trunks." The alternate path may be referred to as a "bypass tunnel."

Various types of data may be transmitted between nodes in a data communication network. A primary path carrying a certain type or types of data may have a specific setup priority and a specific holding priority. The setup priority and holding priority determine which primary path may be established on the network if the network is running low on resources (e.g., bandwidth), or alternately, which existing primary path may be preempted from the network. Holding priorities may be used to rank existing primary paths, and setup priorities may be used to determine if a new primary path can preempt an existing primary path. The setup priority and holding priority may be assigned a value in a range, e.g., zero (0, lowest) to seven (7, highest). The setup priority and holding priority may define the relative importance of the data traffic. A primary path with a higher setup priority may preempt an existing primary path with a lower holding priority. A primary path may have the same value for the primary path's setup priority and holding priority (e.g., a setup priority of seven (7) and a holding priority of seven (7)) or different values (e.g., a setup priority of six (6) and a holding priority of five (5)). Thus, when primary paths are being established, a primary path with a setup priority of six (6), for example, has a higher priority of being set up than all other primary paths having priorities lower than six (6). Also, the same primary path may preempt existing primary paths having holding priorities of five (5) or lower if there is not enough network bandwidth to accommodate the primary path. When bypass tunnels are established for primary paths, the bypass tunnels may have the same setup priority and holding priority as the corresponding primary paths.

As is well known, network circuits may be overbooked (also known as oversubscribed) using an overbooking factor. Overbooking of a network may also be referred to as oversubscription of a network, and the overbooking factor may be referred to as an oversubscription factor. In this disclosure, the term "overbooking factor" may be interchangeable with "oversubscription factor."

There may be at least three different kinds of overbooking factors. One is for trunks, another is for primary paths, and the third is for bypass tunnels. It is well known that a trunk may be overbooked so that the trunk may provide more bandwidth to subscribers than physically available. The bandwidth provided by the trunk may be referred to as a provisioned bandwidth of the trunk. The provisioned bandwidth of the trunk may also be referred to as a logical bandwidth of the trunk. For example, a trunk may have a physical bandwidth of one Gbps (1 Gigabits per second). If the trunk's overbooking is two-to-one (2:1), e.g., an overbooking factor of two-hundred percent (200%), then the trunk may provide a two (2) Gbps logical bandwidth for all the primary paths or bypass tunnels carried by the trunk. That is, from a primary path's perspective or a bypass tunnel's perspective, the trunk appears to have a physical bandwidth of two (2) Gbps. In the description below, the physical bandwidth referred to is the physical bandwidth from the perspective of primary paths or bypass tunnels.

All primary paths carried on a trunk may be overbooked as well. That is, a primary path may have a physical bandwidth on the trunk but may offer more bandwidth to the data traffic carried on the primary path. Continuing the previous example, a primary path may have a physical bandwidth of two hundred Mbps (200 Megabits per second) on the trunk and may have an overbooking factor of two-hundred percent (200%). That is, the primary path offers four hundred (400) Gbps bandwidth to data traffic carried by the primary path. The four hundred (400) Mbps bandwidth may be referred to as a provisioned bandwidth of the primary path. The provisioned bandwidth of the primary path may also be referred to as a logical bandwidth of the primary path.

When placing a bypass tunnel on a second trunk for a primary path, a network administrator may set a bypass overbooking factor. Because the bypass tunnel may be used to provide a backup of the primary path and may not carry data traffic during normal operation of the network, the network administrator may want to conserve bandwidth on the second trunk by setting a bypass tunnel overbooking factor less than one-hundred percent (100%). Continuing the previous example, the bypass tunnel overbooking factor for the two hundred (200) Mbps primary path may be set to ten-percent (10%), so the primary path may appear to have a twenty (20) Mbps physical bandwidth for the second trunk where the bypass tunnel may be placed. All data traffic carried on the bypass tunnel may not be impacted, because the data traffic is still offered the logical bandwidth of the primary path, not the bypass tunnel's bandwidth. That is, the data traffic carried on the bypass tunnel may still see that the bypass tunnel has a bandwidth of four hundred (400) Mbps.

As is well known, network link protection may be carried out by a Next Hop protection scheme or a Next Next Hop protection scheme. In a Next Hop protection scheme, a physical link between a first node and a second node may be protected by a different route from the first node to the second node. The different route may be referred to as a Next Hop trunk. Exemplary embodiments described herein may provide protection for a physical link by applying a Next Hop protection scheme. In a Next Next Hop protection scheme, a physical link between a first node and a second node, and the second node itself, may both be protected by a different route from the first node to a third node immediately downstream from the second node. The different route may be referred to as a Next Next Hop trunk. Exemplary embodiments described herein may further provide protection for a link/node by applying a Next Next Hop protection scheme.

Each Next Hop trunk or Next Next Hop trunk may have one or more existing primary paths. A bypass tunnel may consider a "priority bandwidth" of a Next Hop trunk or Next Next Hop trunk to determine whether the Next Hop trunk or Next Next Hop trunk may have enough bandwidth to accommodate the bypass tunnel. As described previously, a bypass tunnel may also have a setup priority and a holding priority. A bypass tunnel with a higher setup priority may preempt existing primary paths with lower holding priorities. Therefore, for the bypass tunnel, physical bandwidths allocated to existing primary paths with holding priorities equal to or higher than the bypass tunnel's setup priority are not available. The amount of physical bandwidth of a Next Hop trunk or Next Next Hop trunk that is available for a bypass tunnel may be referred to as a priority bandwidth, which is the total bandwidth of the trunk minus all of the physical bandwidths allocated to existing primary paths with equal or higher holding priority values. Physical bandwidth of any bypass tunnels that may be built on the Next Hot trunk or Next Next Hop trunk are not considered in determining the priority bandwidth. For example, a Next Hop trunk may have a physical bandwidth of ten (10) Gbps. The Next Hop trunk may have two existing primary paths. The first primary path may have a logical bandwidth of four (4) Gbps, an overbooking factor of four hundred (400%), a physical bandwidth of one (1) Gbps, a setup priority of seven (7) and a holding priority of five (5). The second primary path may have a logical bandwidth of ten (10) Gbps, an overbooking factor of one-thousand percent (1000%), a physical bandwidth of one (1) Gbps, a setup priority of six (6) and a holding priority of six (6). For a bypass tunnel with a setup priority of seven (7), the priority bandwidth is ten (10) Gbps because there is no existing primary path with a holding priority of seven (7) on the Next Hop trunk 204. For a bypass tunnel with a setup priority of six (6), the priority bandwidth is nine (9) Gbps because the second primary path has a holding priority of six (6) and the second primary path's physical bandwidth of one (1) Gbps is not available for the bypass tunnel. For a bypass tunnel with a setup priority of five (5), the priority bandwidth is eight (8) Gbps because the first primary path has a holding priority of five (5) and the second primary path has a holding priority of six (6). For the bypass tunnel, the priority bandwidth is ten (10) Gbps minus one (1) Gbps for the first primary path, and minus one (1) Gbps for the second primary path. Therefore, for each bypass tunnel, a Next Hop trunk or Next Next Hop trunk may have a different available physical bandwidth depending on the setup priority of the bypass tunnel.

Exemplary embodiments described herein may provide link/node protection. Such link/node protection may set up bypass tunnels for each primary path on a first trunk with the bypass tunnels being placed on one or more trunks (e.g., alternate trunks) other than the first trunk. The bypass tunnels are the result of a Next Hop or a Next Next Hop protection scheme. Each primary path may build a corresponding bypass tunnel based on a pre-determined order of the setup priority and physical bandwidth of the primary path. Each bypass tunnel may be placed using a trunk selection scheme. The trunk selection scheme may start with a constraint-based trunk-selection algorithm, compute a priority bandwidth for each available Next Hop or Next Next Hop trunk, employ a threshold value for the priority bandwidth, conserve the bandwidth on the alternate trunk by either setting a user defined value for a reserved physical bandwidth for the bypass tunnel or applying a bypass tunnel overbooking factor to the physical bandwidth of the primary path, and perform preemption when necessary. Additionally, exemplary link/node protection may associate all primary paths on the first trunk with their corresponding bypass tunnels on the other trunks in a database and reroute all data traffic on the first trunk to the other trunks when a failure occurs for a primary path. Further, link/node protection may be applied during primary path setup, periodically to optimize network bypass tunnel design, and/or any time a network administrator may decide.

The description below describes networks, network nodes and methods implemented by the networks or network nodes. It is noted that the methods may be implemented as software and software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

FIG. 1 is a block diagram of an exemplary network node 100 with four hosted network interfaces, 104a, 104b, 104c, and 104d. Though the network node 100 of FIG. 1 is shown with four hosted network interfaces 104, in practice a network node may have any number of hosted network interfaces. In an exemplary embodiment, the network node 100 may be a piece of communication equipment such as, but not limited to, a switch, a router, a computer, an Optical Cross-connect device, a digital Cross-connect device, or other network equipment capable of receiving and transmitting packets in a connection oriented network that pre-calculate paths based on priorities of data traffic.

Each network interface of a network node may be coupled to a network link. The network links may connect the network node to other network nodes in a network. A network node with multiple hosted network interfaces that are coupled to multiple network links may receive packets on a first network interface and direct the packets to another network interface for transmission. Link/node protection may be implemented in the network, such that, if the transmission of the packets through the second network interface is unsuccessful, the network node may re-direct the packets that would be transmitted by the second network interface to a third network interface for transmission.

Referring to FIG. 1, the network node 100 has a control component 102. The control component 102 may comprise hardware (e.g., processors, memories, hard drives, disk storages), software (e.g., programs, databases), and any combination thereof. The network interfaces 104a, 104b, 104c, and 104d may be coupled to trunks (not shown), respectively. The control component 102 may direct packets received from a first network interface 104a to a second network interface 104b for transmission. The packets may be data traffic on a primary path. If the second network interface 104b fails to transmit the packets successfully (e.g., network interface 104b itself fails, the trunk coupled to network interface 104b fails, or the down stream network node fails), the control component 102 may re-direct the packets to be transmitted by the third network interface 104c or the fourth network interface 104d. The re-direction may be pre-determined, such that the trunk coupled to the third network interface 104c or the fourth network interface 104d may be designated as a backup trunk (e.g., alternate trunk) for the trunk coupled to the second network interface 104b before the transmission failure occurs. In the event of a failure on a primary path, the data traffic may be re-routed to a bypass tunnel. Thus, the network node 100 may implement a link/node protection scheme that designates a second trunk to carry an alternative path (e.g., a bypass tunnel) for a primary path carried on a first trunk.

There may be a plurality of primary paths carried on the first trunk. One or more alternate trunks may be needed to carry corresponding bypass tunnels. The first trunk that carries the primary paths may be referred to as a protected trunk. The designation of an alternate trunk to carry the corresponding bypass tunnel may be referred to as placing or building a bypass tunnel on the alternate trunk.

The control component 102 may identify a trunk to be protected, and place bypass tunnels on alternate trunks for each primary path on the protected trunk. For example, the control component 102 may identify the network link coupled to the network interface 104b to be a protected trunk and the network links coupled to network interfaces 104c, 104d to be alternate trunks. Thus, the control component 102 may place corresponding bypass tunnels on network links coupled to the network interfaces 104c, 104d for primary paths going through the network interface 104b.

Figure 2:
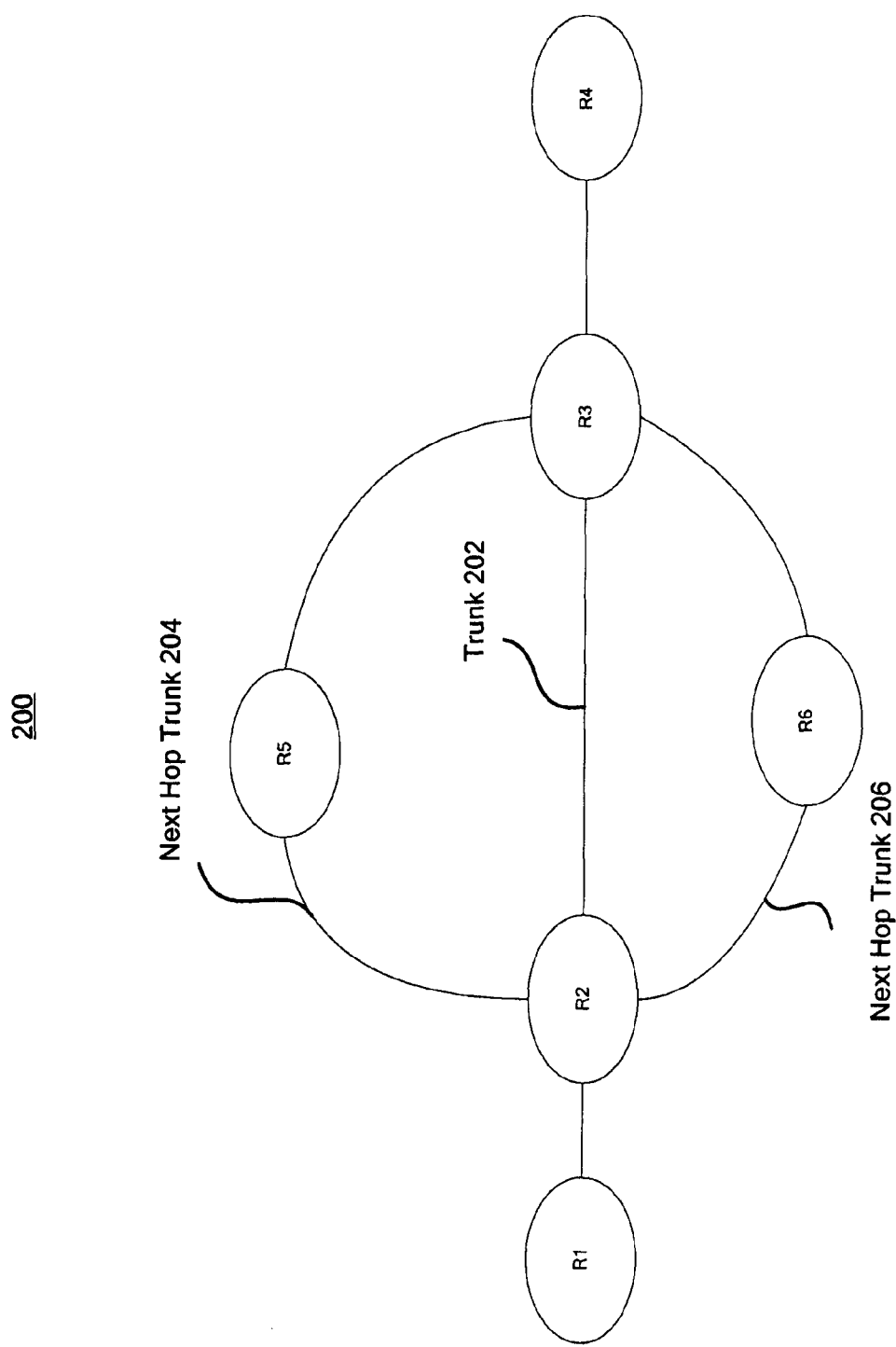
FIG. 2 is a schematic diagram of a trunk protected by multiple Next Hop trunks according to an exemplary embodiment.

FIG. 2 is a schematic diagram of a trunk protected by multiple Next Hop trunks according to an exemplary embodiment. As shown, a network 200 may have a source node R1 and a destination node R4. Multiple primary paths between nodes R1 and R4 may go through a trunk 202, which is between nodes R2 and R3. The trunk 202 may be referred to as a protected trunk. To protect the trunk 202, the network 200 may be configured to find all available Next Hop trunks for the protected trunk 202 and place corresponding bypass tunnels on the available Next Hop trunks for all primary paths on the protected trunk 202. The placement of bypass tunnels may be calculated at a designated server of the network or may be performed by one or more nodes, e.g., node R2. For example, a first Next Hop trunk (e.g., Next Hop trunk 204) and a second Next Hop trunk (e.g., Next Hop trunk 206) may be identified as the available Next Hop trunks. The Next Hop trunk 204 may pass through node R5 and the Next Hop trunk 206 may pass through node R6. Node R3 may build a bypass tunnel on Next Hop trunk 204 and/or Next Hop trunk 206 for each primary path on protected trunk 202 respectively. The protected trunk 202 may be a high bandwidth trunk and the available Next Hop trunks 202, 204 may be low bandwidth trunks.

The link/node protection scheme may start by determining the physical bandwidth of each primary path on the protected trunk. Referring to FIG. 2, node R3 may determine the physical bandwidths of each primary path on the protected trunk 202 using the overbooking factors. For example, a primary path may have an overbooking factor of four-hundred percent (400%). If the logical bandwidth of the path is four hundred (400) kbps, the physical bandwidth of the path is one hundred (100) kbps. The physical bandwidths for each primary path are the demands that may be placed on the available Next Hop trunks.

The corresponding bypass tunnels for the primary paths may be established on a one-by-one basis using a predetermined order, e.g., a descending order of the setup priority of each primary path. For paths with the same setup priorities, bypass tunnels may be established using a predetermined order, e.g., a descending order of the physical bandwidth of the primary path. For example, in the network 200, there may be four primary paths: Paths A, B, C and D carried on the protected trunk 202. Path A may have a setup priority of seven (7), Path B may have a setup priority of five (5), Path C may have a setup priority of five (5), and Path D may have a setup priority of zero (0). Path C may have a larger physical bandwidth than Path B. Node R3 may build bypass tunnels for each primary path in a descending order of setup priority. Therefore the link/node protection scheme may build bypass tunnels for Path A first, then Path C, then Path B, then Path D.

After the selection of a primary path, an alternate trunk for the bypass tunnel may be selected. The alternate trunk may be selected from a plurality of available Next Hop trunks. The selection of the alternate trunk may start with a constraint-based trunk-selection algorithm such as, but not limited to, Constraint-based Shortest Path First (CSPF). The CSPF algorithm may apply constraints first and then a cost matrix. The selection of a Next Hop trunk for a specific path may apply existing constraints and an existing cost matrix. For example, the CSPF algorithm may start with administrative group settings constraint. The CSPF algorithm may also apply other constraints, such as, but not limited to, administrative cost, CSPF area settings, and explicit route instructions.

The administrative group settings constraint may also be referred to as "coloring" or "matching of color." Each trunk in a network may have a specific color (e.g., red, blue, or yellow) specified by a network administrator. The network administrator may also establish a color (e.g., red, blue, or yellow) for each primary path of the network. When a primary path may be set up, the color of trunks associated with the primary path may be required to conform to a color requirement of the primary path. For example, a red primary path may only be placed on blue or red trunks. The network administrator may also establish a color (e.g., red, blue, or yellow) for each bypass tunnel in the network. The color of each bypass tunnel may be set to match the color of the corresponding primary path. Alternately, a bypass tunnel may have a color different from the color of the corresponding primary path. The color of each bypass tunnel may be set one-by-one or universally (e.g., the network administrator may use a global setting of the network). The "coloring" of primary paths is well known. When placing bypass tunnels, the "coloring" of bypass tunnels may follow the "coloring" of primary paths.

After applying the constraints, the CSPF algorithm may apply a cost matrix. Cost matrixes are well known. If the CSPF costs are equal, the trunk selection may follow a predetermined order, e.g., a descending order of the priority bandwidth of the trunks for the bypass tunnel's setup priority.

If a primary path on the protected trunk being considered for a bypass tunnel is larger than the priority bandwidth on any of the available Next Hop trunks, a bypass tunnel for that primary path may not be built. The operation of building bypass tunnels may move to the next primary path, and network operators may be notified of the failure of building a bypass tunnel for that particular primary path. For example, a primary path on protected trunk 202 has a physical bandwidth of ten (10) Gbps and a setup priority of five (5). The priority bandwidth for a holding priority of five (5) may be eight (8) Gbps on the Next Hot trunks 204 and may be six (6) Gbps on the Next Hop trunk 206. A bypass tunnel for the primary path could not be built. The operation of building bypass tunnels may move to the next primary path on the protected trunk 202 and a network administrator may be notified of the failure.

A network administrator may set a threshold for availability of a Next Hop trunk for each holding priority value. That is, the network administrator may determine that a Next Hop trunk may be taken out of a pool of available Next Hop trunks when the available physical bandwidth for a given holding priority value on the Next Hop trunk reaches a specified level. The specified level may be user configurable and adjustable. For example, when the priority bandwidth on the Next Hop trunk 204 becomes less than or equal to twenty-percent (20%) of the physical bandwidth for a holding priority value of five (5), the Next Hop trunk 204 may be moved into a standby status when building bypass tunnels for primary paths with a setup priority value of five (5). That is, no additional bypass tunnels may be built on the Next Hop trunk 204 for primary paths of setup priority value of five (5) unless the Next Hop trunk 206 also reaches the standby status for the holding priority value of five (5). In that case, all alternate trunks in standby status may become active again, and the priority bandwidths on the alternate trunks may be re-calculated. Bypass tunnels may then be placed upon the Next Hop trunk 204 and the Next Hop trunk 206 according to a new descending sequence of the priority bandwidth.

When each bypass tunnel is placed, no physical bandwidth may be reserved on the Next Hop trunk accommodating the bypass tunnel. Upon completion of placing corresponding bypass tunnels for each primary path of the protected trunk, the reserved physical bandwidth for the corresponding bypass tunnels on the Next Hop trunks may be set to a specified value (e.g., zero) by a network administrator. Alternately, the reserved physical bandwidth for the corresponding bypass tunnels may be set by adjusting the physical bandwidth of the primary path of the bypass tunnel by a bypass tunnel overbooking factor. A network administrator may set the bypass tunnel overbooking factor on a trunk-by-trunk basis or universally.

A specified low value (e.g., zero (0)) of the reserved physical bandwidth for the bypass tunnel or a low bypass tunnel overbooking factor (e.g., zero (0)) may be set. Because bypass tunnels may not carry any data traffic before a link failure occurs on the primary path, the available physical bandwidth may be reserved for other primary paths or bypass tunnels by setting a low value of the reserved physical bandwidth for the bypass tunnel or a low bypass tunnel overbooking factor. For example, a primary path on the protected trunk 202 may have a logical bandwidth of four hundred (400) kbps, an overbooking factor of four (4) and a physical bandwidth of one hundred (100) kbps. A bypass tunnel for the primary path may be placed on the Next Hop trunk 204 with a reserved physical bandwidth being set directly to a low value, e.g., ten (10) kbps or zero (0). Alternately, the reserved physical bandwidth may be set by adjusting the primary path's physical bandwidth by a bypass tunnel overbooking factor such as, but not limited to ten-percent (10%) or zero (0). If the reserved physical bandwidth of the bypass tunnel is set to zero (0) or the bypass tunnel overbooking factor on the Next Hop trunk 204 is set at zero (0), the bypass tunnel will not reserve physical bandwidth on the Next Hop trunk 204. If the reserved physical bandwidth of the bypass tunnel is set to ten (10) kbps, or a bypass tunnel overbooking factor is set at ten-percent (10%), the bypass tunnel will reserve ten (10) kbps bandwidth on the Next Hop trunk 204. Whether the reserved physical bandwidth is ten (10) kbps or zero (0), the data traffic on the bypass tunnel may not be impacted, because the bypass tunnel still has a provisioned bandwidth of one hundred (100) kbps. That is, from the perspective of the data traffic carried on a primary path or a bypass tunnel, the bandwidth is the full logical bandwidth.

In the event that the bypass tunnel overbooking factor is set to a non-zero value, the combined physical bandwidths of the bypass tunnels and the existing primary paths on the Next Hop trunk may exceed the physical bandwidth of the Next Hop trunk. The link/node protection scheme may use a preemption algorithm as known in the art. For example, the protected trunk 202 may have a primary path that has a physical bandwidth of one hundred (100) Gbps, a setup priority of five (5), and a holding priority of five (5). A bypass tunnel for the primary path may be placed on the Next Hop trunk 204. The priority bandwidth for holding priority five (5) may be fifteen (15) Gbps on the Next Hop trunk 204. The Next Hop trunk 204 may have a ten-percent (10%) overbooking factor for bypass tunnels. After placing all corresponding bypass tunnels for each of primary paths on the protected trunk 202, the one hundred (100) Gbps physical bandwidth primary path may reserve ten (10) Gbps physical bandwidth for the bypass tunnel. But the Next Hop trunk 204 may have only five (5) Gbps physical bandwidth left because existing primary paths on the Next Hop trunk 204 with holding priorities less than five (5) may have used ten (10) Gbps physical bandwidth. The bypass tunnel may preempt one or more existing primary paths or one or more bypass tunnels with holding priorities lower than five (5) on the Next Hop trunk 204 to reserve the ten (10) Gbps physical bandwidth on the Next Hop trunk 204.

The bypass tunnels may be established when primary paths are first set up. The bypass tunnels may then go into hibernation or standby mode until they are triggered by a failure of the protected trunk. For example, a failure may be detected by Loss Of Signal (LOS) as defined in FRR specifications, and all traffic may then be routed from the primary paths onto the corresponding bypass tunnels. Referring back to FIG. 2, all primary paths on the protected trunk 202 may be bundled with all bypass tunnels on the Next Hop trunks 204, 206. That is, all primary paths on the protected trunk 202 may be associated with corresponding bypass tunnels on the Next Hop trunks 204, 206. The association information may be maintained in the control component 102 on node R3. Upon detection of the LOS on a primary path on the protected trunk 202, all data traffic for all primary paths on the protected trunk 202 may be re-routed to bypass tunnels on the Next Hop trunks 204, 206. Typically, this re-routing occurs quickly, e.g., within fifty milliseconds (50 ms).

The operation of building bypass tunnels for primary paths on a protected trunk may be carried out periodically. A network administrator may trigger the operation or pre-schedule the operation. The network bypass tunnels may be updated by using the latest network resources parameters. For example, the network 200 may schedule periodic bypass tunnel building for all primary paths on the protected trunk 202 to provide link protection for the protected trunk 202.

Figure 3:
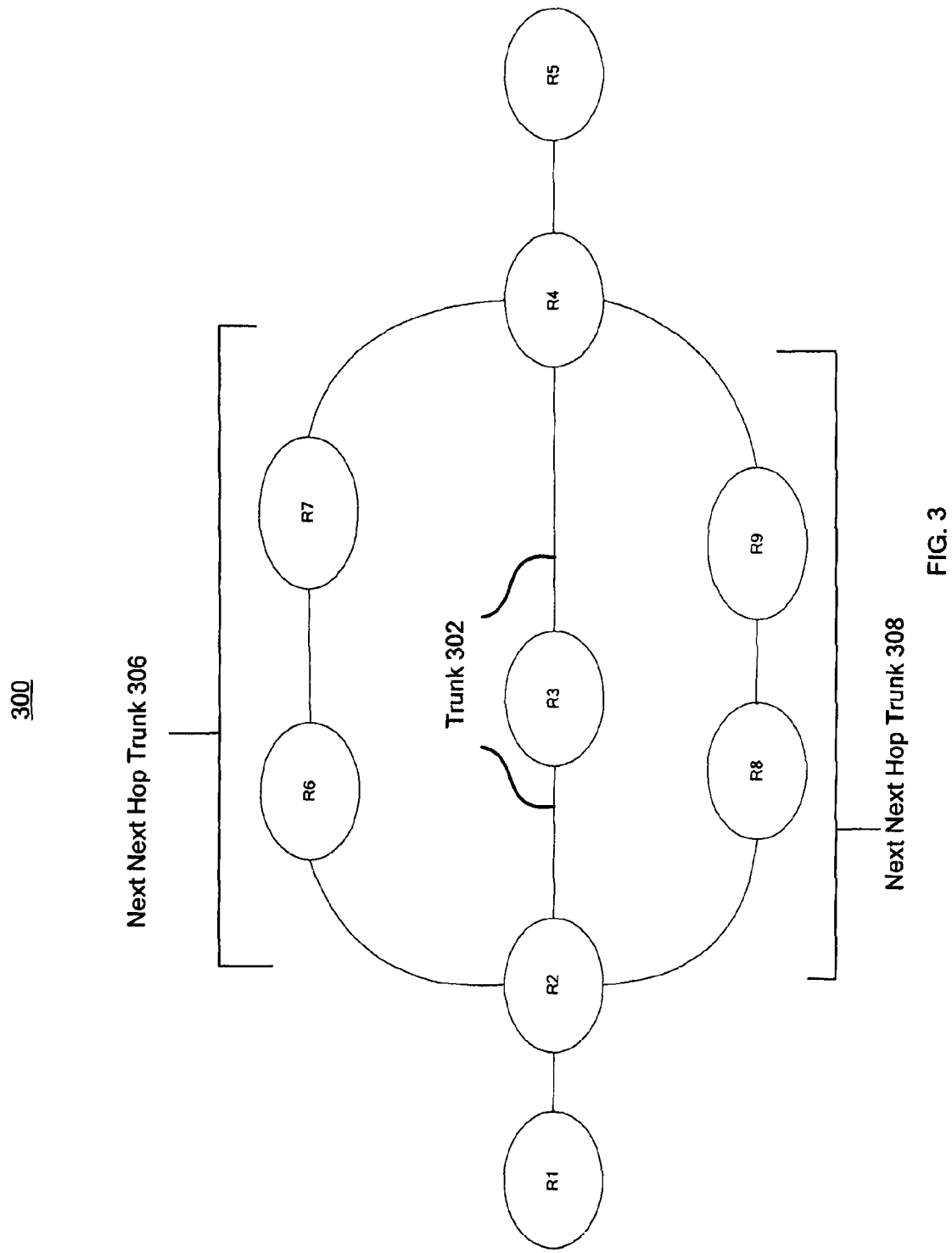
FIG. 3 is a schematic diagram of a link/node protected by multiple Next Next Hop trunks according to an exemplary embodiment.

FIG. 3 is a schematic diagram of a link/node protected by multiple Next Next Hop trunks according to an exemplary embodiment. The above described Next Hop link/node protection may also be applied to a Next Next Hop protection scheme. As shown in FIG. 3, a network 300 may have a source node R1 and a destination node R5. A trunk 302 between nodes R2 and R4 may comprise node R3. To protect node R3 and the trunk 302, a first Next Next Hop trunk (e.g., Next Next Hop trunk 306) and a second Next Next Hop trunk (e.g., Next Next Hop trunk 308) may be used to establish bypass tunnels for all primary paths carried on the trunk 302. The Next Next Hop trunk 306 may pass through nodes R6 and R7. The Next Next Hop trunk 308 may pass through nodes R8 and R9. The establishment of bypass tunnels for each primary path using the Next Next Hop trunks may apply the operation described above for Next Hop trunks in a similar manner.

Figure 4:
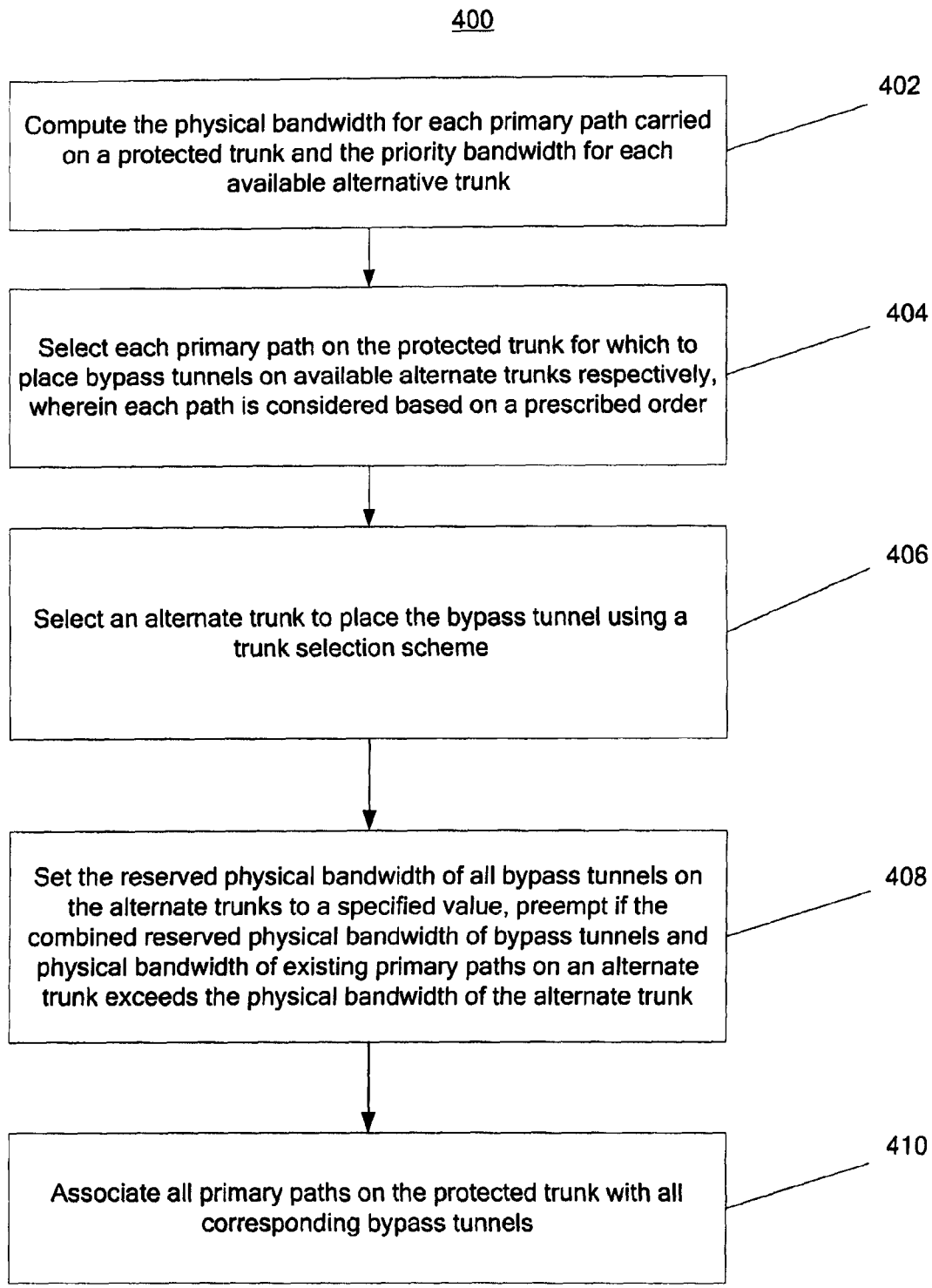
FIG. 4 is a flow diagram of a method to implement link/node protection according to an exemplary embodiment.

FIG. 4 is a flow diagram of a method to implement link/node protection according to an exemplary embodiment. Method 400 may start at block 402. In block 402, a node in a network may compute the physical bandwidth for each primary path carried on a protected trunk and the priority bandwidth for each available alternate trunk. Typically, the node handling the computation may be an immediate upstream node of the protected trunk (e.g., the node immediately before the protected trunk along the data traffic path). The immediate upstream node may implement the link/node protection. The physical bandwidth for a primary path may be computed by dividing the logical bandwidth of the primary path by the overbooking factor of the primary path. A priority bandwidth for a holding priority of an available alternate trunk may be calculated as described previously. For example, in network 200, a protected trunk 202 starts from a network interface of an immediate upstream node R2. Node R2 may implement the link/node protection to protect the protected trunk 202. Available Next Hop trunks may be the Next Hop trunk 204 and the Next Hop trunk 206. Node R2 may compute the physical bandwidth for each primary path carried on the protected trunk 202. Node R2 may also compute the priority bandwidth for each holding priority of the available Next Hop trunks 204, 206. The method 400 may continue to block 404.

In block 404, the immediate upstream node may select each primary path on the protected trunk for which to place bypass tunnels on available alternate trunks, respectively, wherein each path is considered based on a prescribed order. For example, node R2 of network 200 may select each primary path on the protected trunk 202 to place bypass tunnels on the Next Hop trunks 204, 206. Each primary path on the protect trunk 202 may be considered in a descending order of setup priority. For primary paths with the same setup priority, each primary path may be considered in a descending order of physical bandwidth. The method 400 may continue to block 406.

In block 406, the immediate upstream node may select an alternate trunk to place the bypass tunnel using a trunk selection scheme. The trunk selection scheme may comprise selecting available alternate trunks based on a constraint-based trunk-selection algorithm, considering available alternate trunks in a prescribed order of priority bandwidth, notifying the network administrator if the largest priority bandwidth is less than the physical bandwidth of the primary path considered before moving to place bypass tunnel for the next primary path, enforcing a user specified threshold value of a priority bandwidth for an available alternate trunk to enter into a standby status and reactivate the available alternate trunk when all available alternate trunks enter into the standby status. For example, Node R3 may implement the trunk selection scheme that select available alternate trunks based on a Constraint-based Shortest Path First algorithm. Then, the Next Hop trunks 204, 206 may be considered in a descending order of priority bandwidth for the corresponding setup priority of the primary path being considered. A network administrator of network 200 may be notified if the largest priority bandwidth for the corresponding setup priority is less than the physical bandwidth of the primary path considered. The network administrator may take action to improve the design of the network (e.g., adding a new trunk to balance the data traffic loads). Node R3 may also enforce a user specified threshold value, e.g., twenty-percent (20%) of total physical bandwidth. That is, when a priority bandwidth of Next Hop trunk 204, or Next Hop trunk 206 may be equal to or less than twenty-percent (20%) of the total physical bandwidth, the Next Hop trunk may be put into a standby status and may not be assigned any additional bypass tunnels until all available Next Hop trunks enter the standby status. When all available Next Hop trunks are in standby status, then the standby Next Hop trunks may become active again, and the priority bandwidth on the available Next Hop trunks are calculated again. Bypass tunnels may then be placed upon the available Next Hop trunks according to a new descending order of the priority bandwidth. The twenty-percent (20%) may be configured and adjusted by the network administrator. The method 400 may continue to block 408.

In block 408, the immediate upstream node may set the reserved physical bandwidth of all bypass tunnels on the alternate trunks to a specified value. The immediate upstream node may perform preemption if the combined reserved physical bandwidth of bypass tunnels and physical bandwidth of existing primary paths on an alternate trunk exceeds the physical bandwidth of the alternate trunk. The specified value may be a user defined value or determined by a bypass overbooking factor on the alternate trunks. The physical bandwidth for a bypass tunnel may be determined after all the bypass tunnels have been placed for a protected trunk. The physical bandwidths of a bypass tunnel may be set to a user defined value such as, but not limited to, zero (0). Alternately, the physical bandwidth of the bypass tunnel may set by applying a bypass overbooking factor (e.g., ten-percent (10%)) to the physical bandwidth of the corresponding primary path. This setting may reserve network resources because the bypass tunnels may not be used before there is a link failure for the protected trunk. By setting the bypass overbooking factor to a value less than one-hundred percent (100%), the alternate trunks may accommodate more bypass tunnels or carry more primary paths. The user defined physical bandwidth value for the bypass tunnel and bypass overbooking factor may be set by a network administrator for a specific protected trunk or universally for every protected trunk.

For example, a primary path on the protected trunk 202 may have a physical bandwidth of two hundred (200) kbps. Node R2 may place a bypass tunnel on the Next Hop trunk 204 for the primary path. Node R2 may specify a user defined physical bandwidth value for the bypass tunnel (e.g., two hundred (200) kbps) or apply a bypass tunnel overbooking factor of one-hundred percent (100%). In either case, two hundred (200) kbps may be reserved for this bypass tunnel. Available bandwidth on the Next Hop trunk 204 may decrease accordingly although the two hundred (200) kbps may not be used before a failure occurs on the protected trunk 202. A network administrator may define the value for the physical bandwidth of the bypass tunnel to be twenty (20) kbps, or apply a bypass tunnel overbooking factor of ten-percent (10%) to the physical bandwidth of the corresponding primary path. Either way, the bypass tunnel may only reserve twenty (20) kbps and does not reserve the additional one hundred and eighty (180) kbps. The bypass overbooking factor may be set to zero (0) if the network administrator decides not to reserve bandwidth for bypass tunnels.

By setting a non-zero value for the physical bandwidth of bypass tunnel or applying a non-zero bypass tunnel overbooking factor, preemption may occur. When the physical bandwidth of a bypass tunnel is not zero, the combined reserved physical bandwidth of bypass tunnels and physical bandwidth of existing primary paths on the alternate paths may exceed the physical bandwidth of the alternate trunk. The bypass tunnels with higher setup priorities may preempt bypass tunnels with lower holding priorities or existing primary paths with lower holding priorities as is well known. The method 400 may continue to block 410.

In block 410, the immediate upstream node may associate all primary paths on the protected trunk with all corresponding bypass tunnels. All primary paths on the protected trunk and their corresponding bypass tunnels on the Next Hop trunks may be "bundled" together, so that re-routing can occur at about the same time. For example, after all bypass tunnels have been established for all primary paths on the protected trunk 202, node R3 may associate all primary paths on the protected trunk 202 and their corresponding bypass tunnels placed on the Next Hop trunks 204, 206. So if a failure is detected for any primary paths on the protected trunk 202, all data traffic of all primary paths on the protected trunk 202 may be re-routed to corresponding bypass tunnels on the Next Hop trunks 204, 206. The method 400 may end.

The method 400 may also be applied to protect a network node. To protect a network node, the method 400 may be applied to place bypass tunnels on Next Next Hop trunks. An immediate upstream node may perform the steps of method 400 to protect a trunk and the immediate upstream node of the trunk. The steps of method 400 may be performed to place bypass tunnels for each of the primary paths on the protected trunk on Next Next Hop trunks in a similar manner.

Thus, the network nodes may implement link/node protection by placing bypass tunnels among available alternate trunks. The link/node protection may be implemented in a MPLS Traffic Engineering enabled environment and any other network environment that pre-calculates a path and assigns a setup priority and a holding priority. The link/node protection may provide link protection under Next Hop protection scheme, e.g., link protection. The link/node protection may also provide link/node protection under Next Next Hop protection scheme, e.g., node protection. The link/protection may protect a high bandwidth trunk by using bypass tunnels on multiple low bandwidth trunks. The link/protection may be applied to a specific link/node or may be applied for all links/nodes of a network. Further, the link/node protection may be implemented to establish bypass tunnels when the primary paths are set up or periodically to account for changing conditions.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
   selecting, at a control component comprising one or more processors, a primary path on a first trunk for which to place a corresponding bypass tunnel on an alternate trunk;
   determining, at the control component, if one or more alternate trunks have sufficient priority bandwidth, wherein the priority bandwidth of each alternate trunk is a total bandwidth of the respective alternate trunk minus a physical bandwidth allocated to all existing primary paths on the respective alternate trunk with equal or higher holding priority values; and
   if at least one of the one or more alternate trunks has priority bandwidth larger than the physical bandwidth of the primary path, selecting, at the control component, one of the one or more alternate trunks having priority bandwidth larger than the physical bandwidth of the primary path and placing the bypass tunnel on the selected alternate trunk having priority bandwidth larger than the physical bandwidth of the primary path.

2. The method of claim 1, further comprising selecting each primary path on the first trunk to place a corresponding bypass tunnel.

3. The method of claim 2, further comprising re-routing primary paths to their corresponding bypass tunnels within a specified time in response to the first trunk failing.

4. The method of claim 1, further comprising:
   placing the selected alternate trunk in a standby status when the priority bandwidth of the selected alternate trunk is not greater than a threshold value; and
   re-activating all alternate trunks in the standby status when all of the alternate trunks enter standby status.

5. The method of claim 1, further comprising:
   setting a reserved physical bandwidth for the bypass tunnel on the selected alternate trunk, wherein the reserved physical bandwidth is set to a user specified value.

6. The method of claim 1, further comprising:
   setting a reserved physical bandwidth for the bypass tunnel on the selected alternate trunk, wherein the reserved physical bandwidth is set using a bypass overbooking factor.

7. The method of claim 1, further comprising preempting one or more existing primary paths or one or more bypass tunnels on the selected alternate trunk when the bandwidth of all existing primary paths and bypass tunnels exceeds the physical bandwidth of the selected alternate trunk.

8. The method of claim 1, wherein the primary path is a Label Switched Path (LSP) in a MPLS Traffic Engineering enabled network.

9. The method of claim 1, wherein the physical bandwidth of the primary path is a logical bandwidth of the primary path divided by an overbooking factor of the primary path.

10. The method of claim 1, wherein the first trunk is a direct physical link and the one or more alternate trunks are Next Hop trunks.

11. The method of claim 1, wherein the first trunk is a physical link comprising a node and the one or more alternate trunks are Next Next Hop trunks.

12. The method of claim 1, wherein the one or more alternate trunks are selected using a Constraint-based Shortest Path First (CSPF) algorithm.

13. The method of claim 12, wherein the Constraint-based Shortest Path First (CSPF) algorithm comprises constraints of: administrative cost, administrative group settings, CSPF area settings, and explicit route instructions.

14. The method of claim 1, wherein the first trunk is a high bandwidth trunk and the one or more alternate trunks are low bandwidth trunks.

15. A non-transitory computer readable media comprising code to perform the method of claim 1.

16. A network node comprising:
a control component comprising one or more processors, the control component configured to:
select a primary path on a first trunk for which to place a corresponding bypass tunnel on an alternate trunk;
determine if one or more alternate trunks have sufficient priority bandwidth, wherein the priority bandwidth of each alternate trunk is a total bandwidth of the respective alternate trunk minus a physical bandwidth allocated to all existing primary paths on the respective alternate trunk with equal or higher holding priority values; and
if at least one of the one or more alternate trunks has priority bandwidth larger than the physical bandwidth of the primary path, select one of the one or more alternate trunks having priority bandwidth larger than the physical bandwidth of the primary path and place the bypass tunnel on the selected alternate trunk having priority bandwidth larger than the physical bandwidth of the primary path; and
at least one network interface.

17. The network node of claim 16, further configured to associate all primary paths and their corresponding bypass tunnels and re-route all primary paths to their corresponding bypass tunnels within a specified time in response to the first trunk failing.

18. The network node of claim 16, wherein the first trunk is a direct link.

19. The network node of claim 16, wherein the one or more alternate trunks are Next Hop trunks.

20. The network node of claim 16, wherein the one or more alternate trunks are Next Next Hop trunks.

* * * * *